United States Patent
Tsuru

(10) Patent No.: US 7,438,778 B2
(45) Date of Patent: Oct. 21, 2008

(54) ELASTIC ENDLESS CRAWLER AND METHOD OF MANUFACTURING THE SAME

(75) Inventor: Eiji Tsuru, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 348 days.

(21) Appl. No.: 10/866,730

(22) Filed: Jun. 15, 2004

(65) Prior Publication Data
US 2004/0224118 A1 Nov. 11, 2004

Related U.S. Application Data

(62) Division of application No. 10/089,243, filed as application No. PCT/JP00/09378 on Dec. 28, 2000, now Pat. No. 6,843,539.

(30) Foreign Application Priority Data

| Aug. 8, 2000 | (JP) | ............................. 2000-239784 |
| Sep. 4, 2000 | (JP) | ............................. 2000-266548 |
| Sep. 4, 2000 | (JP) | ............................. 2000-266549 |

(51) Int. Cl.
*G03D 15/04* (2006.01)

(52) U.S. Cl. ................. 156/159; 156/304.1; 156/304.3; 156/304.5; 156/304.6; 305/170

(58) Field of Classification Search ................. 428/105, 428/122, 295.4, 300.1, 298.1, 295.1; 264/405, 264/272.1, 272.13, 108; 156/159, 304.1, 156/304.3, 304.5, 304.6; 305/170; 474/254
See application file for complete search history.

(56) References Cited

U.S. PATENT DOCUMENTS

| 1,612,024 | A | * | 12/1926 | Jacobs | ........................ 474/262 |
| 3,007,826 | A | * | 11/1961 | Brooksbank | ................. 474/254 |
| 3,101,290 | A | * | 8/1963 | Paul | ............................. 156/137 |
| 3,342,656 | A | * | 9/1967 | Papageorges | ................ 156/159 |
| 3,351,508 | A | * | 11/1967 | Baxendale | .................... 156/159 |
| 3,419,449 | A | * | 12/1968 | Di Valcrio et al. | ........... 156/159 |
| 3,481,807 | A | * | 12/1969 | Kanamori | .................... 156/159 |
| 3,693,218 | A | * | 9/1972 | Jaubert et al. | ................... 24/38 |
| 3,874,963 | A | * | 4/1975 | Barger | ........................ 156/73.2 |
| 3,895,990 | A | * | 7/1975 | Josteit | ...................... 156/304.3 |
| 4,279,676 | A | * | 7/1981 | Morrison et al. | ............. 156/159 |
| 4,564,542 | A | * | 1/1986 | Worcester | ..................... 428/58 |
| 4,904,319 | A | * | 2/1990 | Divincenzo et al. | ........ 156/73.4 |
| 5,405,477 | A | * | 4/1995 | Arnold | ..................... 156/304.3 |
| 5,824,383 | A | * | 10/1998 | Tuttle et al. | .................... 428/60 |
| 5,961,760 | A | * | 10/1999 | Tajima et al. | ................ 156/139 |
| 6,523,915 | B1 | | 2/2003 | Matsuo | |
| 6,554,934 | B1 | | 4/2003 | Steven et al. | |
| 6,689,247 | B1 | * | 2/2004 | Steven et al. | .............. 156/304.5 |

(Continued)

FOREIGN PATENT DOCUMENTS

DE 198 44 309 A1 4/1999

(Continued)

*Primary Examiner*—N Edwards
(74) *Attorney, Agent, or Firm*—Oliff & Berridge, PLC

(57) ABSTRACT

An elastic endless includes an annular belt-shaped elastic crawler body and a plurality of cords with ends, the cords being disposed substantially parallel with one another at predetermined intervals and embedded in the crawler body, wherein one end and the other end of each cord are overlapped, as seen from the belt side.

17 Claims, 24 Drawing Sheets

U.S. PATENT DOCUMENTS

| | | | |
|---|---|---|---|
| 6,797,088 B2 * | 9/2004 | Solinski | 156/73.4 |
| 7,036,893 B2 * | 5/2006 | Tsuru | 305/170 |

FOREIGN PATENT DOCUMENTS

| | | |
|---|---|---|
| EP | 1 116 644 A1 | 7/2001 |
| JP | 51-45128 | 12/1976 |
| JP | 53-126136 | 1/1978 |
| JP | 53-11135 | 10/1978 |
| JP | 54-3737 | 12/1979 |
| JP | A 56-167568 | 12/1981 |
| JP | A 4-283180 | 8/1992 |
| JP | A 6-1271 | 1/1994 |
| JP | A 6-270854 | 9/1994 |
| JP | A 11-171061 | 6/1999 |
| JP | A 11-300846 | 11/1999 |
| JP | A 11-301536 | 11/1999 |
| JP | A 2000-33657 | 2/2000 |
| JP | A 2000-344115 | 12/2000 |
| JP | A 2001-18863 | 1/2001 |

* cited by examiner

FIG.4

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 |
|---|---|---|---|---|---|---|---|
| DIAMETER OF STEEL CORD (mm) | 3.2 | 4.3 | 2.7 | 3.2 | 3.2 | 4.3 | 2.7 |
| PITCH OF STEEL CORD ALIGNMENT (mm) | 6.4 | 8.8 | 4.3 | 7.3 | 4.7 | 5.9 | 4 |
| VERTICAL INTERVAL OF JOINT PORTION (mm) | −0.1 | −0.3 | −0.2 | −0.5 | +0.6 | +0.5 | +0.3 |
| FLEXURAL RIGIDITY (MAIN BODY:100) | 10 | 9 | 8 | 7 | 13 | 14 | 12 |
| NUMBER OF TIMES TO FLEXURAL FATIGUE (TEN-THOUSAND TIMES) | 160 | 198 | 178 | 196 | 89 | 95 | 115 |
| DIAMETER OF FLEXURAL PULLEY (mm) | 320mm | 450mm | 270mm | 320mm | 320mm | 450mm | 270mm |

FIG.11

| | COMPARATIVE EXAMPLE 1 | COMPARATIVE EXAMPLE 2 | COMPARATIVE EXAMPLE 3 | EXAMPLE 1 | EXAMPLE 2 |
|---|---|---|---|---|---|
| DIAMETER OF STEEL CORD (mm) | 3.2 | 3.2 | 3.2 | 3.2 | 3.2 |
| PITCH OF STEEL CORD ALIGNMENT (mm) | 4.7 | 6.4 | 7.3 | 6.4 | 7.3 |
| VERTICAL INTERVAL OF JOINT PORTION (mm) | +0.6 | −0.1 | −0.5 | −0.1 | −0.5 |
| FLEXURAL RIGIDITY (MAIN BODY:100) | 13 | 10 | 8 | 7 | 6 |
| NUMBER OF TIMES TO FLEXURAL FATIGUE (TEN-THOUSAND TIMES) (DIAMETER OF FLEXURAL PULLEY 320mm) | 89 | 160 | 196 | 300 OR MORE | 300 OR MORE |

ELASTIC ENDLESS CRAWLER AND METHOD OF MANUFACTURING THE SAME

This is a Division of application Ser. No. 10/089,243 filed Jun. 7, 2002 now U.S. Pat. No. 6,843,539, which in turn is a National Stage of PCT/JP00/09378 filed Dec. 28, 2000. The entire disclosure of the prior applications is hereby incorporated by reference herein in its entirety.

TECHNICAL FIELD OF THE INVENTION

The present invention relates to an elastic endless crawler, which comprises an annular belt-shaped elastic crawler body and a plurality of cords with ends, the cords being embedded in the crawler body so as to extend substantially in parallel with one another at a predetermined pitch in a crawler body peripheral direction, and to a method of making the same.

BACKGROUND ART

An elastic endless crawler, for example, an annular rubber crawler comprising a body made from rubber, is employed in many kinds of machines. In general, this rubber crawler has steel cords, which include ends, embedded therein for reinforcement.

When this rubber crawler is being used, there are concerns that the ends of the steel cords embedded in the rubber crawler body might break through the crawler body and protrude therefrom, or that the rubber crawler might run off of a unit for driving rotations thereof. A variety of proposals have been made with respect to these problems. To solve the above-described problems from a new point of view, the present inventor has invented a new and very novel elastic endless crawler, and a method of manufacturing the same.

DISCLOSURE OF THE INVENTION

In order to achieve the above-described objects, in accordance with one aspect of the present invention, there is provided an elastic endless crawler comprising an annular belt-shaped elastic crawler body and cords having ends, said cords being disposed substantially parallel with one another at predetermined intervals and embedded in the crawler body, such that the one end and the other end of each cord overlap, as seen from the belt side.

In accordance with another aspect of the present invention, there is provided an elastic sheet used for manufacturing an annular belt-shaped elastic crawler in which cords having ends are embedded within the crawler body such that one end and the other end of each cord are overlapped, as seen from the belt side, the sheet comprising: a sheet body; and cords having ends, which cords are embedded within the sheet body such that the cords are disposed substantially parallel with one another at a predetermined pitch.

In accordance with yet another aspect of the present invention, there is provided a method of manufacturing an elastic endless crawler, the method comprising the steps of: (A) forming an elastic sheet, which includes a sheet body and cords having ends embedded within the sheet body, said cords being disposed substantially parallel with one another at predetermined pitches; (B) forming a non-endless belt which includes two end portions of the elastic sheet and the remaining portion of the elastic sheet, with said remaining portion being coated with a predetermined material; and (C) overlapping the two end portions of the non-endless belt and then applying pressure to them such that they are integrated and that one end and the other end of each cord are overlapped, as seen from a side of the belt.

In accordance with still another aspect of the present invention, there is provided a method of manufacturing an elastic endless crawler, comprising the steps of: (A) forming an elastic sheet, which includes a sheet body and cords having ends embedded within the sheet body, said cords being disposed substantially parallel with one another at predetermined pitches; (B) overlapping the two end portions of the non-endless belt and then applying pressure to integrate the end portions, while simultaneously making the one end and the other end of each cord are overlap, as seen from the belt side; and (C) forming an annular belt, in which the elastic sheet is entirely coated with a predetermined material.

BRIEF DESCRIPTION OF THE DRAWINGS

FIG. 4 is a table showing experimental results.

FIG. 11 is a table showing experimental results.

BEST MODE FOR CARRYING OUT THE INVENTION

The present invention will be hereinafter described with reference to the attached drawings and in connection with embodiments thereof. However, it should be understood that the present invention is not limited to these embodiments. For example, rubber crawlers can be broadly divided into two types: a heavy-load type rubber crawler which includes cores embedded therein at predetermined pitches along a longitudinal direction of the crawler body, which cores are engageable with a drive wheel of a vehicle moving portion (crawler apparatus), and a low-load type or low-noise rubber crawler, which does not include the cores. The present invention can be applied to both of these types. In the specification, illustration and description of these cores are omitted as appropriate.

Steel cords are generally used as embedded cords for reinforcing a rubber crawler. However, a member comprised of organic fiber such as aromatic amide, polyester, or nylon can be used and a member comprised of twisted multifilament and twisted monofilament can also be used. When a rubber-coated cloth is used as a wrapping member, a monofilament yarn, which is a component thereof, preferably has a diameter of 0.15~0.25 mm. Furthermore, when a rubber covered cord is used as the wrapping member, which is formed by driving and plain-weaving (40 threads/50 mm) monofilament yarn (diameter 0.2 mm), and then by wrapping a wrapping member, i.e., the rubber coated cloth that is covered with a rubber material, can be used.

First Embodiment

A first embodiment will be described with reference to FIGS. 1 to 6.

Figure 1:
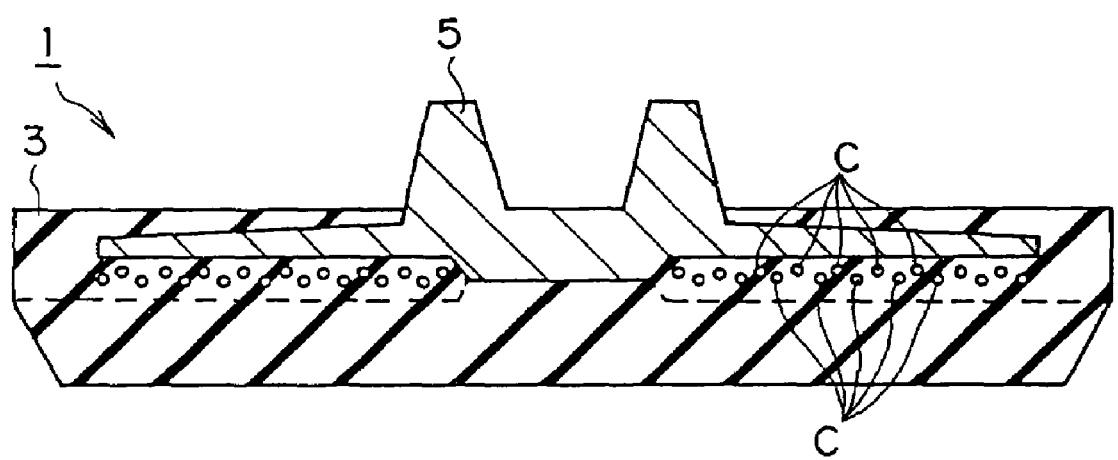
FIG. 1 is a transverse sectional view of a rubber crawler according to a first embodiment.

FIG. 1 is a transverse sectional view taken along a line orthogonal to a longitudinal direction of a rubber crawler 1 of the first embodiment. The rubber crawler 1 includes an inner peripheral surface, corresponding to an upper portions of the carrier 1 in FIG. 1, for engaging with a driving element (e.g., drive wheel), and an outer peripheral surface, corresponding to a lower portion of the crawler 1 in FIG. 1, for contacting a course (e.g., the ground), on which the crawler runs.

The rubber crawler 1 includes a crawler body 3 having a core 5 partially embedded therein, such that most of the core 5 is embedded within the crawler body 3, and the remaining part thereof protrudes upwards. Embedded with a certain regularity beneath each of portions of the core 5 that extend to the left and right in the same figure is a plurality of steel cords C.

Figure 2:
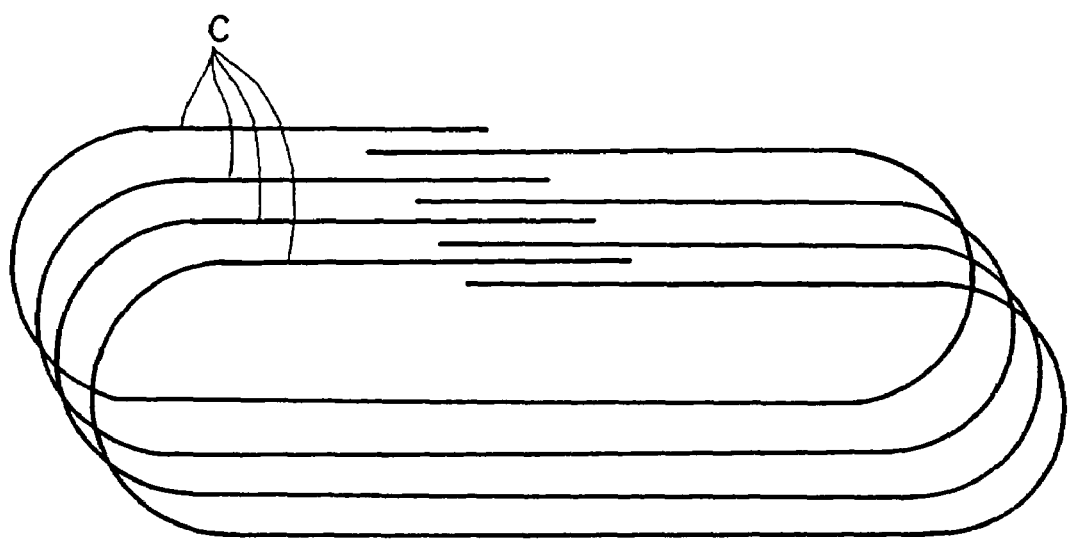
FIG. 2 is a perspective view showing a cord arrangement of the first embodiment.

FIG. 2 is a perspective view, illustrating a portion of a group of the cords C that reinforce the rubber crawler 1 and are embedded within the crawler body 3, to clarify the embedded state of the cords within the crawler body 3.

Figure 3:
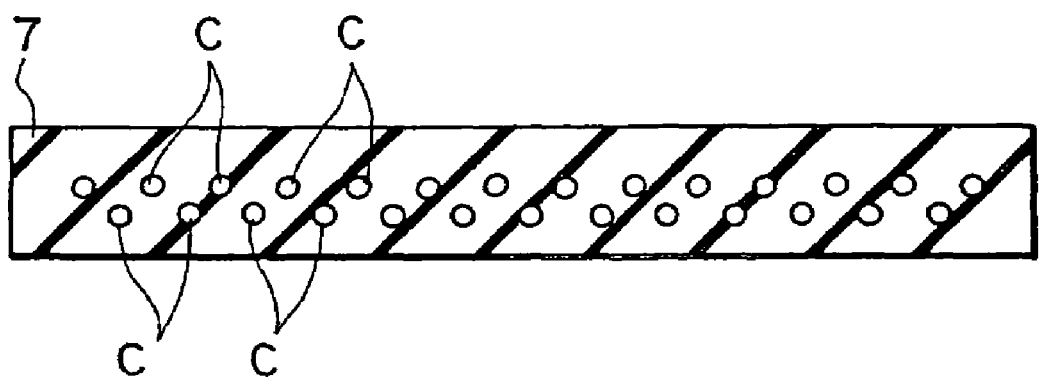
FIG. 3 is a transverse sectional view showing a rubber sheet of the first embodiment.

FIG. 3 is a transverse cross-sectional view of an independently-shown rubber sheet (tension member) 7 which constitutes a main part of a rubber crawler connection portion (joint portion). As can be seen from the same figure, the cords have round cross-sections and are disposed in a zigzag or staggered manner, which generally extends to the left and right of the figure. When seen from the right or left direction, namely, from a side of the rubber sheet, the cords partially overlap each another, with overlapping portions extending along the longitudinal direction of the rubber crawler (i.e., a direction generally perpendicular to the surface of the figure).

As a result of adopting a structure in which a group of cords is embedded in such a unique manner, a difference in rigidity between a connection portion of the rubber crawler and other portions of the rubber crawler can be substantially reduced, as compared with the general difference in rigidity of a conventional rubber crawler. Accordingly, as described hereinbelow, durability of the rubber crawler can be greatly improved.

FIG. 4 illustrates results of an endurance test performed in connection with the present embodiment.

Each rubber crawler of Examples 1 to 4 was formed by sandwiching a predetermined number of steel cords between unvulcanized rubber sheets, and applying pressure thereto from above and below with a press machine to compress the rubber sheets by the amount of 20 mm.

Rubber crawlers of Comparative Examples 1 to 3 are conventional ones in which adjacent cords are not seen overlapped when viewed from the side end.

In the test, rubber crawlers were wound around respective pulleys having diameters approximately 100 times as large as the respective steel cord diameters and then driven for rotation, and thereafter, the rubber crawlers were inspected for a ruptured state of the cords C at the rubber crawler connection portions (or joint portions).

Plus signs in a "Vertical Interval at the Joint Portion (Connection Portion)" column in FIG. 4 indicate cases in which overlaps were not seen when viewed from the side end, and minus signs in the line indicate cases in which overlaps were seen.

By comparing Flex Fatigue Limit Count data when a cord rupture starts, it may be understood that the Actual Examples 1-4 are superior to the Comparative Examples 1 to 3.

Next, brief description will be given of a production method of a rubber crawler according to the present embodiment.

First, a long, thin, unvulcanized rubber sheet is formed. In the formed rubber sheet cords, e g., steel cords C, are embedded so as to be disposed parallel with one another at regular intervals (or pitches) in a predetermined imaginary surface.

Next, opposite ends of the rubber crawler are arranged so as to overlap one another by a predetermined length, and thereafter, the overlapping portions of the rubber sheet are pressed in an overlapping direction by a press machine (not illustrated). The overlapping portions, which have a total thickness of two rubber sheets before press operation, are pressed or integrated so as to have a thickness that is less than the total thickness (but is thicker than one rubber sheet).

Before this press operation, a group of cords embedded in one end of the rubber sheet and another group of cords embedded in the other end of the same rubber sheet are set such that cords are offset with respect to one another by half a pitch.

With this setting, after the press operation, one group of cords and the other group of cords is overlapped one another relative to the thickness direction when viewed from the side end (a side view). The integrally formed, overlapped portion present a rectilinear shape, as seen from the side end, extending along a longitudinal direction of the rubber crawler.

When this compressed region of the rubber sheet (i.e., the rubber sheet connection portion), is seen from a direction perpendicular to a rubber sheet surface, each of the cords of the one cord group appears to be positioned between corresponding cords of the other cord group.

When seen from an transverse cross-section of the compressed rubber sheet connection portion, as described above and as shown in FIG. 3, round cord sections are disposed in a shape of a zigzag, the shape extending in a transverse direction of the rubber sheet (i.e., left-right direction in FIG. 3).

Incidentally, the plurality of cords, which are embedded in the rubber crawler (i.e., the rubber sheet), are disposed parallel with one another with a predetermined pitch, extending in a rubber crawler peripheral direction. Experiments revealed that it is preferable for the pitch and the cord diameter to have the following relation. Namely, where the cord diameter is less than 3 mm, the pitch is preferably twice at least as large as the cord diameter, and where the cord diameter is at least 3 mm, the pitch is preferably at least one and a half times as large as the cord diameter.

With respect to the loop-shaped (or endless) rubber sheet formed as described above, the following process is applied in order to finish or form the rubber crawler. Specifically, the loop-shaped rubber sheet is vulcanized such that the rubber sheet, which includes inner and outer peripheral surfaces, is entirely covered by a rubber material, in order to form a rubber crawler as a finished product. As the vulcanizing process, a feed-type vulcanizing method or an integral vulcanizing method can be adopted.

Figure 5A:
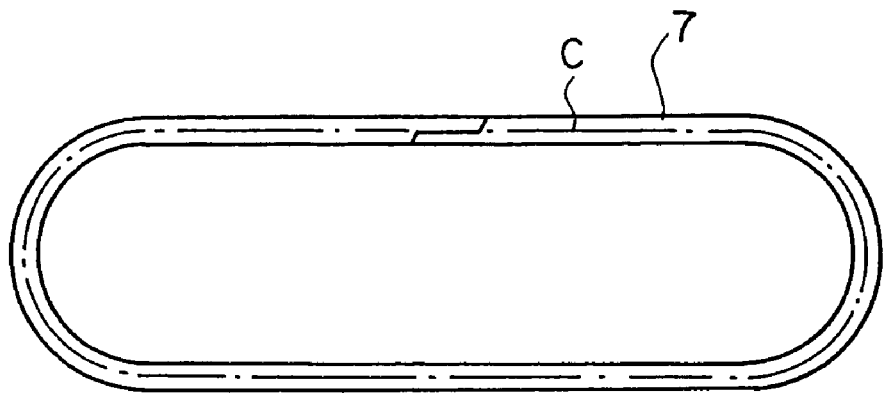
FIGS. 5A to 5C are views showing different stages in a feed-type vulcanizing process.
Figure 5B:
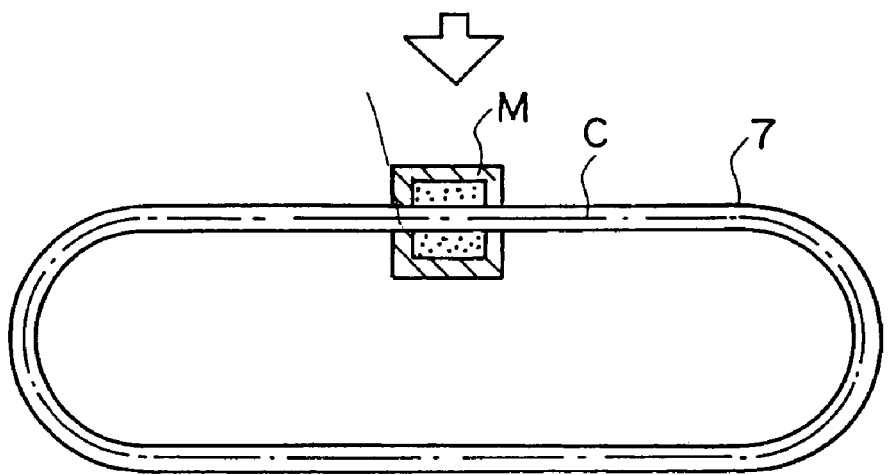
Figure 5C:
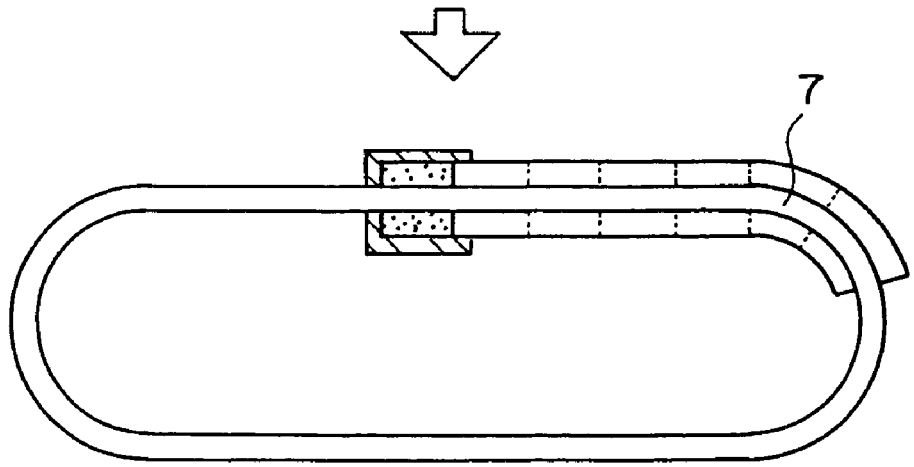

FIGS. 5A to 5C illustrate an example of feed-type vulcanizing process. A brief description of this process will now be given. First, as described above, a loop-shaped rubber sheet 7 with the cords C embedded therein is prepared (see FIG. 5A). Then, the rubber sheet connection portion is enclosed from upper and lower directions (a thickness direction of the rubber sheet) by a mold M (see FIG. 5B). Next, a non-vulcanized rubber material is put into a cavity of the mold and vulcanized. Then, the rubber sheet is moved in the peripheral direction by the length of the vulcanized portion. Thereafter, application of a rubber material and vulcanizing is similarly carried out on the next rubber sheet portion to be vulcanized. This series of processes is repeated with respect to the overall rubber sheet (see FIG. 5C). Thus, the rubber crawler is completed. The aforementioned feed-type vulcanizing method has an advantage of being employable in a compact and relatively low-priced machine.

Figure 6:
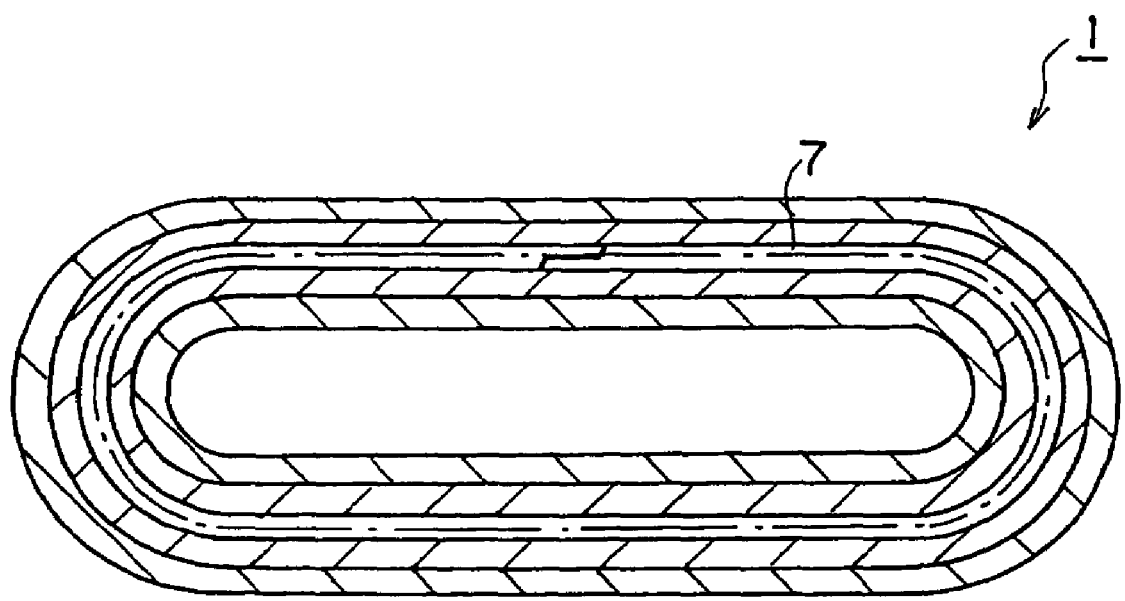
FIG. 6 is a side sectional view of a rubber crawler formed in an integral vulcanizing process.

On the other hand, FIG. 6 illustrates an example of an integral vulcanizing process. A brief description of this process will now be given. Firstly, a long, large mold that can enclose all of a loop-shaped rubber sheet is prepared, the rubber sheet 7 is set in the mold, and then, a non-vulcanized rubber material is put into a mold cavity, and thereafter, a vulcanizing process is carried out thereon. As a result, the rubber crawler is finished all at once. The aforementioned, integral vulcanizing method has an advantage of being able to produce rubber crawlers with a single process production.

It goes without saying that the respective methods described above can be applied to embodiments 2 to 4, which are described below. Further, although the method of the latter has the premise that the rubber sheet is connected and formed in a loop-shape in advance, the present invention is not limited to the same. Namely, it is possible to adopt a manufacturing mode or style in which, prior to forming the loop-shape, most of a non-endless rubber sheet, except the ends thereof, is coated with a rubber crawler body material, and then the rubber sheet is formed in a loop-shape with a connection process. Thereafter, the non-coated portions, i.e., the rubber crawler connection portion, is coated with the rubber crawler body material to finish the rubber crawler. It goes without saying that this style can be applied to respective embodiments described later.

Second Embodiment

Referring now to FIGS. 7 to 10, a second embodiment of the present invention will be described. Parts and portions that are the same as those of the above-described, first embodiment, are denoted by the same reference numerals as in the first embodiment, and description thereof is omitted where appropriate.

Figure 7:
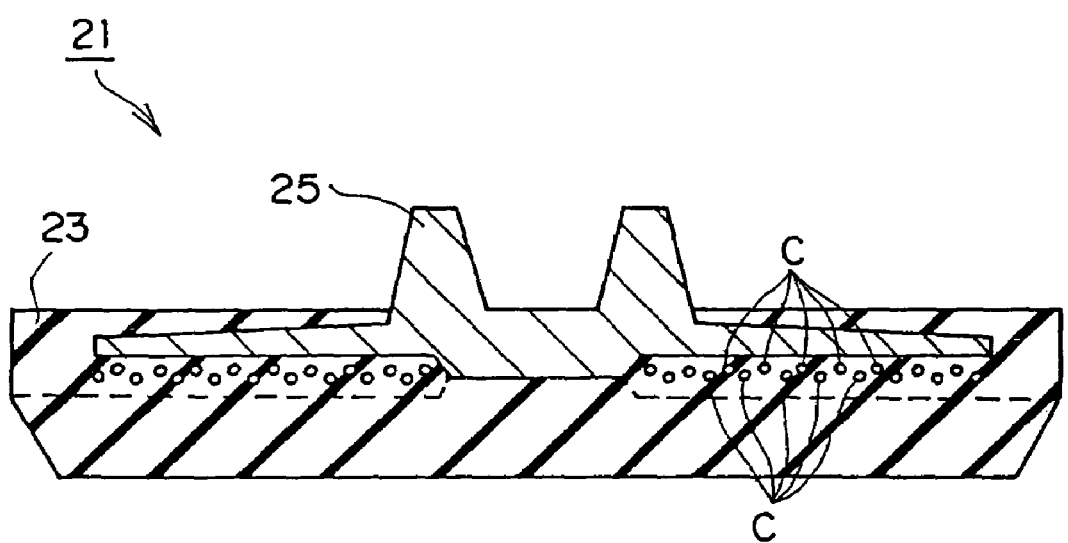
FIG. 7 is a transverse sectional view of a rubber crawler according to a second embodiment.

FIG. 7 is a transverse cross-sectional view taken along an axis perpendicular to a longitudinal axis of a rubber crawler, which includes a rubber crawler body 23. As is similar to the above-described first embodiment, the upper part in FIG. 7 forms a rubber crawler internal peripheral surface and includes cores 25 (only one is shown in the same figure). The lower part in FIG. 7 forms a rubber crawler outer peripheral surface and includes lugs (projections) 29.

Figure 8A:
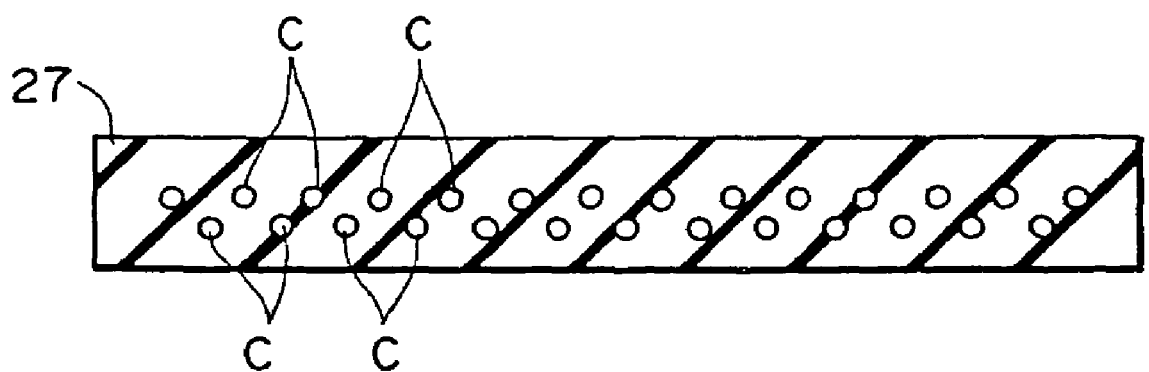
FIGS. 8A and 8B are transverse sectional views of two modes of rubber sheets in the second embodiment.
Figure 8B:
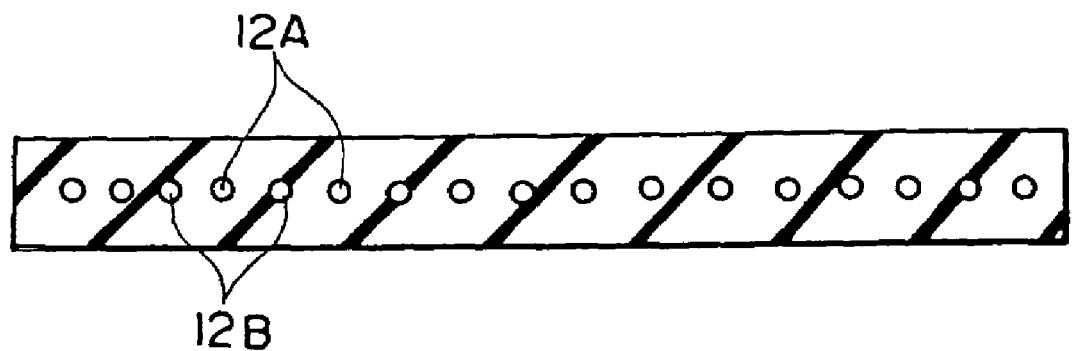

As shown in FIG. 8A, a rubber sheet 27, in which reinforcing cords C are embedded, has approximately the same surface structure as in the first embodiment. Incidentally, as shown in FIG. 8B, an entirely overlapping formation with respect to a crawler thickness direction is also possible. Namely, as seen from the side end, the plurality of cords are completely overlapped and look as if they were one cord. In other words, as shown in FIG. 8B, round cross-sections of the cords are disposed in a line, which is generally horizontal in the figure. Moreover, the arrangement is such that the cords are disposed in an order: a cord 12A, a cord 12B, the cord 12A, the cord 12B, . . .

The cord arrangement within the rubber crawler as shown in FIG. 8A and/or FIG. 8B has, in addition to the regularity of the first embodiment, and further, to an other regularity. In a word, the other regularity is that the tips of the cords are positioned behind the respective cores 25.

Figure 9:
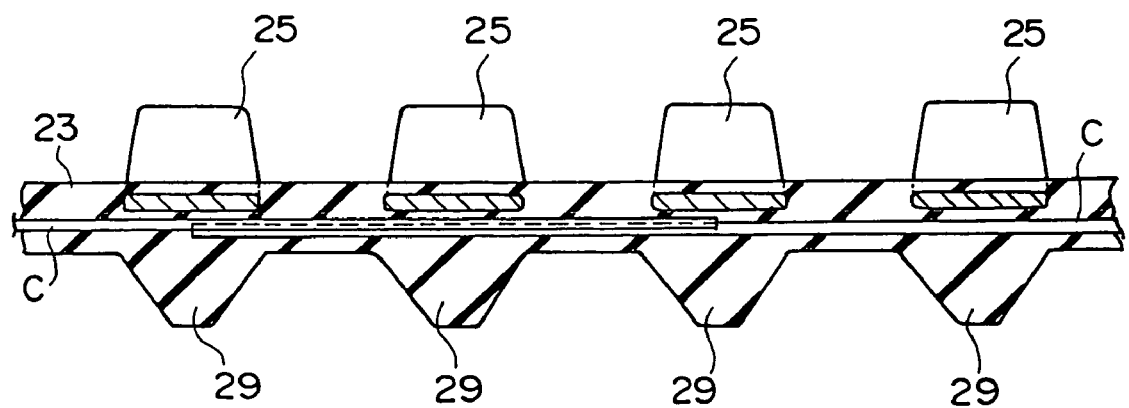
FIG. 9 is a longitudinal sectional view of the rubber crawler of the second embodiment.
Figure 10:
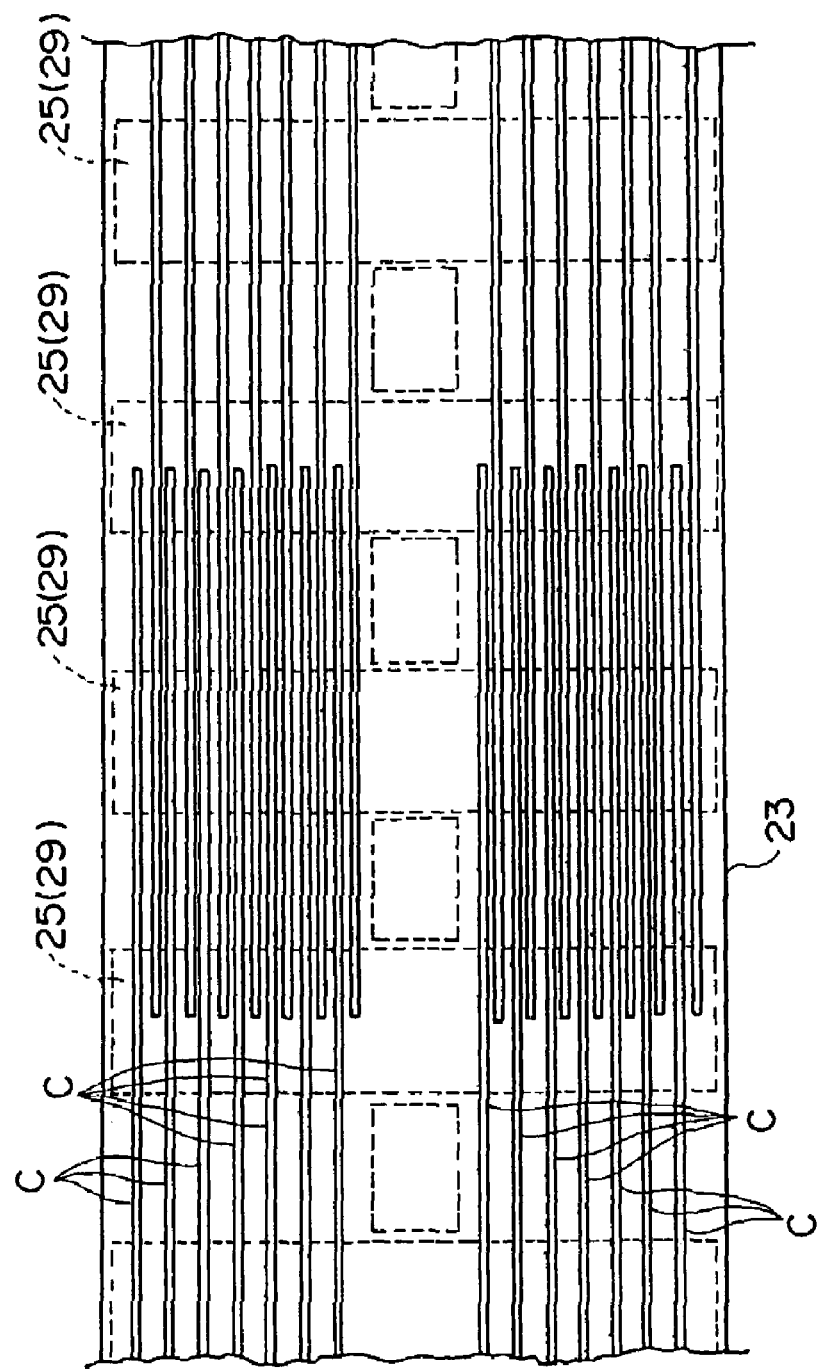
FIG. 10 is a plan view of the rubber crawler of the second embodiment, showing cord groups in an exaggerated manner.

As can be understood from FIGS. 9 and 10, in the viewpoint of FIG. 9, each cord tip is positioned in an area reflected beneath the core 25 and in the viewpoint of FIG. 10 each cord tip is positioned in an area that is occupied by the core.

In the second embodiment, since each core 25 is disposed so as to be opposite a corresponding lug 29, "behind the core 25" and "behind the lug 29" have substantially the same meaning.

By adopting a structure characterized by having the steel cord groups embedded therein, i.e., by adopting a structure in which cords are partially overlapped one another as seen from the side end, with the overlapped portion extending in the rubber crawler longitudinal direction, as described above, it is possible to greatly reduce a difference in rigidity between the rubber crawler connection portion and the remaining rubber crawler portions, which is similar to the above-described first embodiment. In addition thereto, each cord tip is suppressed by the core 25 (and/or lug 29), and, as a result, it becomes difficult for the cord tips to separate. Namely, the chance of penetration of the cord tips from the rubber crawler body 23 can be substantially eliminated.

FIG. 11 illustrates results of an endurance test performed in connection with the second embodiment.

In each of the Examples 1 and 2 and the Comparative Examples 2 and 3, a predetermined number of cords were sandwiched between unvulcanized rubber sheets, and thereafter, the cords and the rubber sheets were pressed from above and below by a press machine so as to be compressed by the amount of 20 mm. The intervals of cores are approximately 100 mm.

The Comparative Examples 1 to 3 each has a structure wherein two cores are disposed in a rubber crawler connection portion and wherein every core is embedded and positioned so as not to suppress each cord tip, as distinct from the second embodiment with respect to relations between the cord tips and the cores.

The Examples 1 and 2 are each structured such that one core is located at the midpoint of the rubber crawler connection portion and two cores sandwiching the one core are each positioned so as to suppress respective cord tips.

In the present experiment, rubber crawlers were wound around respective pulleys having diameters approximately 100 times as large as the respective cord diameters and then driven for rotation. Thereafter, the rubber crawlers were inspected for the ruptured state of the cords C at the rubber crawler connection portion (or joint portion).

On comparing numbers for the Flex Fatigue Limit Count for the cords C, which are positioned at the rubber crawler connection portion (or joint portion) on the rubber crawler internal peripheral side, starting to rupture (including a protrusion etc.), it was confirmed that all of the Examples 1 and 2 were superior in quality to the Comparative Examples 1-3.

Figure 12:
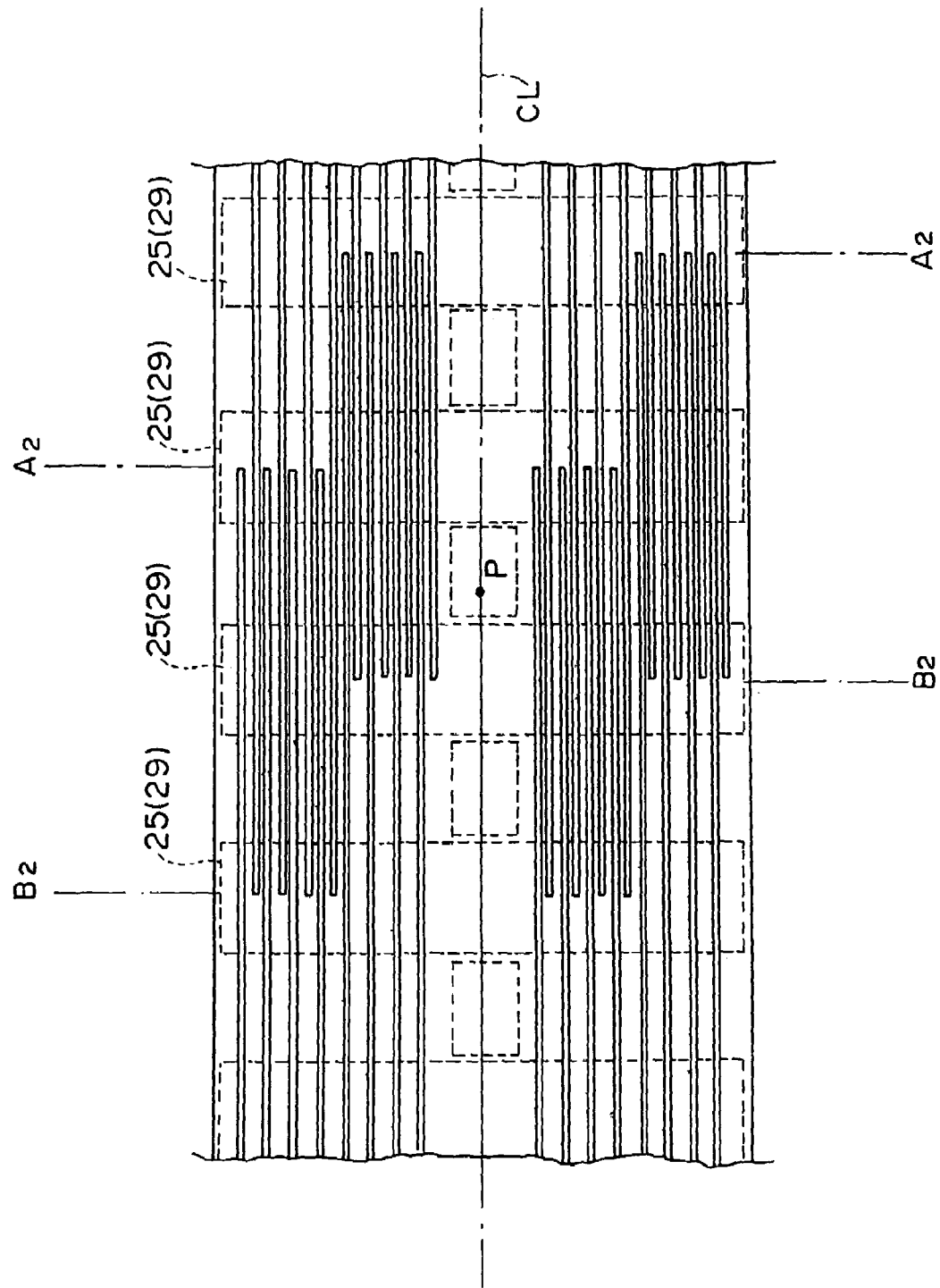
FIG. 12 is a plan view of a rubber crawler according to a modified example of the second embodiment, showing connection portions of cord groups in an exaggerated manner.

Incidentally, FIG. 12 illustrates a plan view of a modified example of the second embodiment. As can be seen from the same figure, in this modified example, an outline $A_2$-$A_2$ formed by connecting cord tips of one ends of cord groups presents a bent line (or tiered line), not a straight line. Similarly, an outline $B_2$-$B_2$ formed by connecting cord tips of another ends of the cord groups presents a crooked line (or tiered line), not a straight line.

There are two groups of cords separated with respect to a center line CL that extends in a rubber crawler peripheral direction, with each side of cord groups being further separated into two groups. Specifically, a configuration formed by the cord tips of the cord groups has a point-symmetry relation relative to a center point P on the center line CL.

This modified embodiment, as is similar to the second embodiment, is structured such that there are provided cores 25 (and/or lugs 29) by which all the cord tips are suppressed. Accordingly, as is similar to the second embodiment, it is possible to greatly reduce a possibility of the jutting out of cords from the crawler body, and therefore, a high degree of reliability and durability of the rubber crawler can be obtained.

Third Embodiment

Referring now to FIGS. 13 to 17, a third embodiment of the present invention will be described. Parts and portions that are the same as those of the above-described first and second embodiments are denoted by the same reference numerals as in the embodiments, and description thereof is omitted where appropriate. Description will be mainly given to points of difference.

In a rubber crawler 31 of the third embodiment, an annular rubber sheet in which the cords C for reinforcing the rubber crawler are embedded, has the same structure as those in the first and second embodiments.

However, the arrangement of the cords C within the rubber crawler conforms to the same regularity as in the first embodiment, and further, to a following certain regularity, which follows and is different from that of the second embodiment. In a word, the latter regulation is that the tips of the cords are not positioned behind the cores but are positioned behind respective lugs (projections) 39 formed at a rubber crawler outer peripheral side or behind respective driven protrusions 35 formed at a rubber crawler inner peripheral side.

Figure 13:
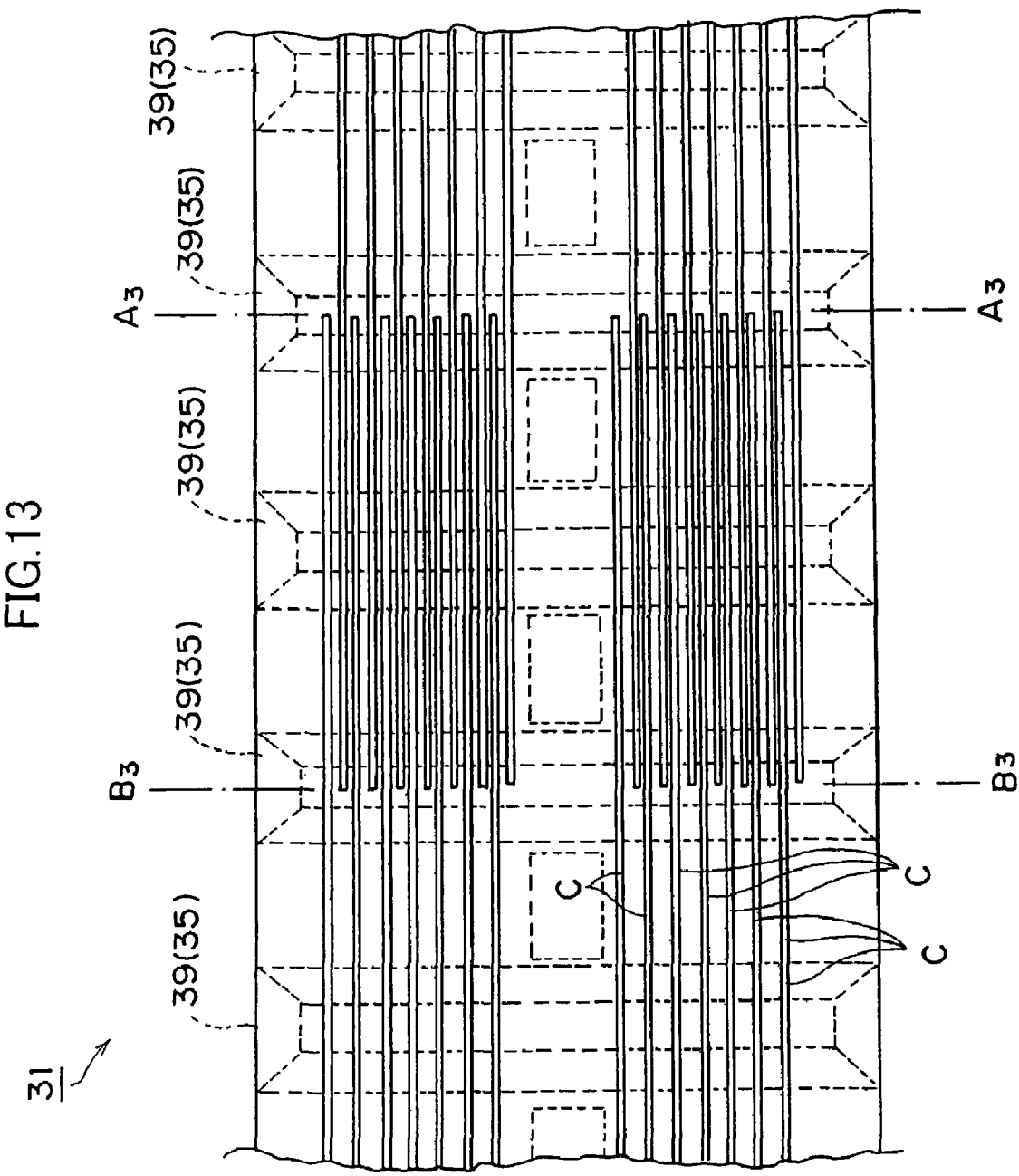
FIG. 13 is a plan view of one embodied rubber crawler according to a third embodiment, showing connection portions of cord groups in an exaggerated manner.
Figure 14:
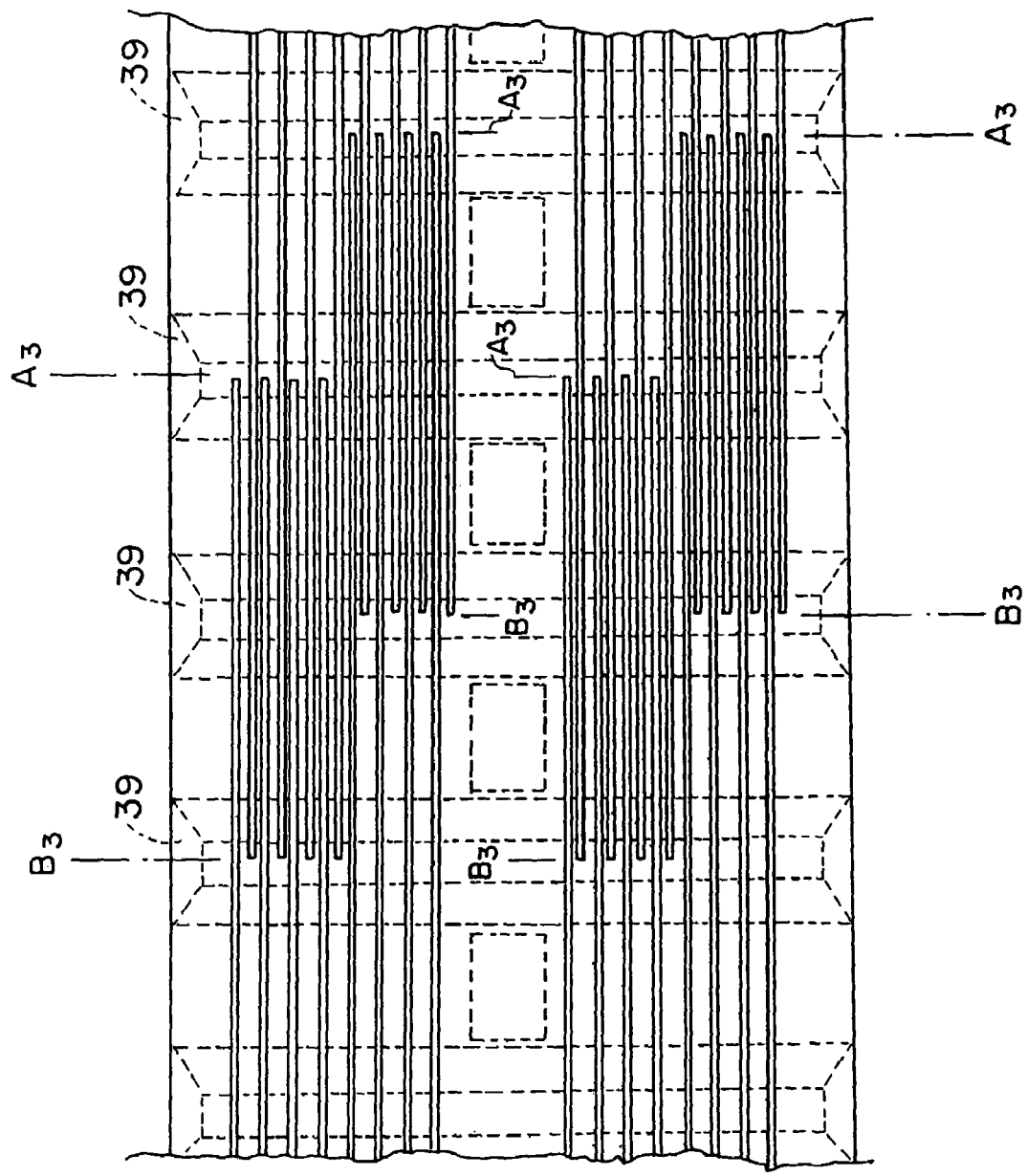
FIG. 14 is a plan view of another embodied rubber crawler according to the third embodiment, showing connection portions of cord groups in an exaggerated manner.
Figure 15:
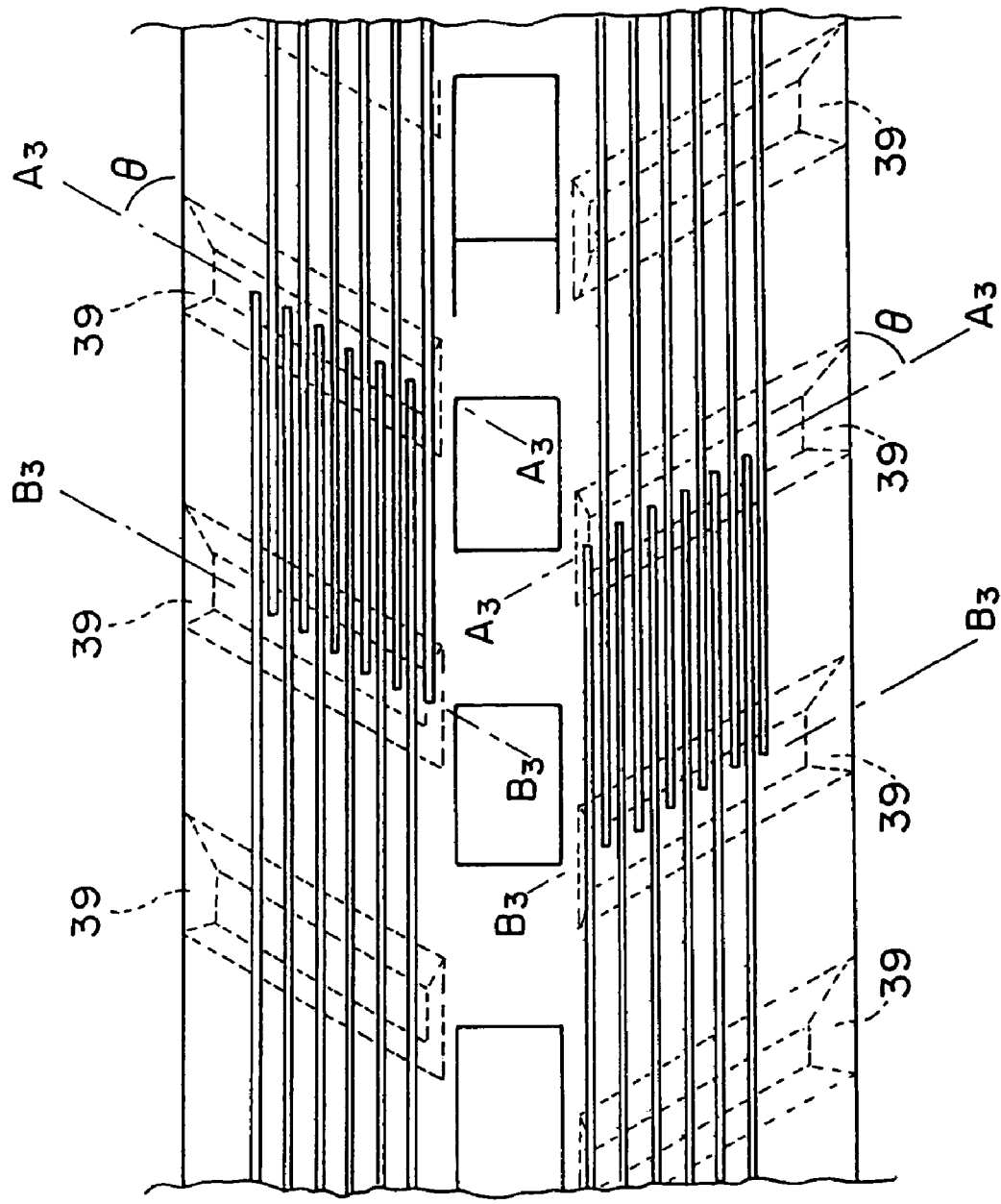
FIG. 15 is a plan view of yet another embodied rubber crawler according to the third embodiment, showing connection portions of cord groups in an exaggerated manner.
Figure 16:
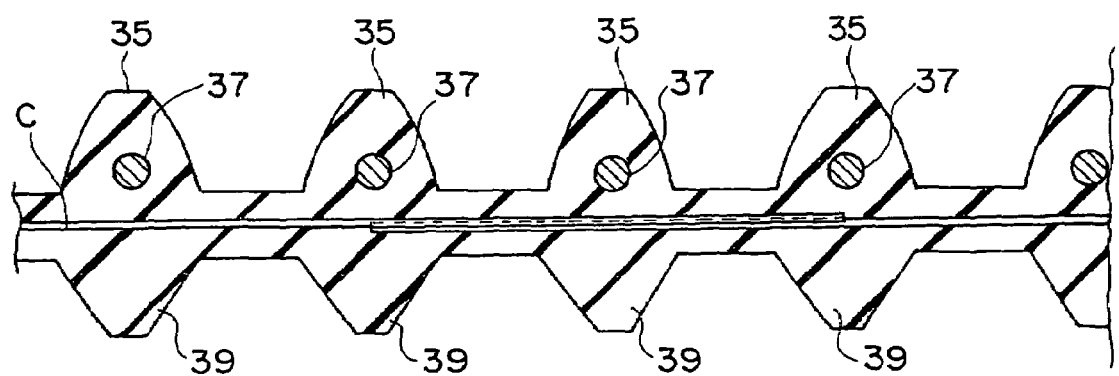
FIG. 16 is a longitudinal sectional view of a rubber crawler according to a modified example of the third embodiment.
Figure 17:
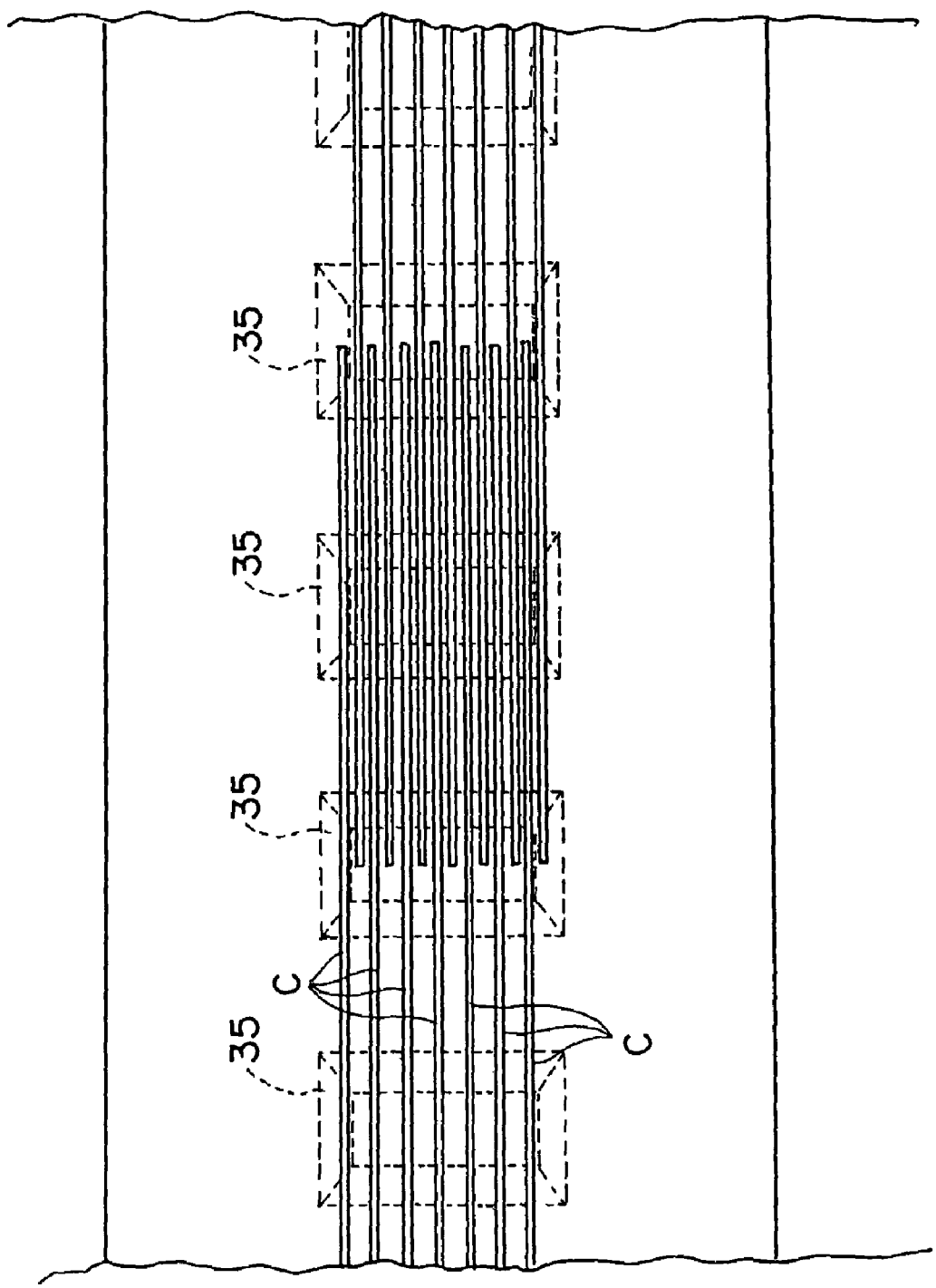
FIG. 17 is a plan view of the rubber crawler of FIG. 16, showing connection portions of cord groups in an exaggerated manner.

FIG. 13 illustrates one mode, and FIGS. 14 and 15 illustrate a different mode, and another different mode, respectively. FIGS. 16 and 17 illustrate still another mode.

In the mode shown in FIG. 13, lugs (projections) 39 are regularly formed at a rubber crawler outer peripheral side, and tips of cords are positioned behind the lugs (projections) 39. Namely, in a plan view of the rubber crawler as shown in FIG. 13, the respective cord tips are positioned in the areas that are occupied by the lugs 39.

In this mode, an outline $A_3$-$A_3$, which is formed by connecting the cord tips at one side of the cords, is a straight line that extends in a transverse direction of the rubber crawler. Similarly, an outline $B_3$-$B_3$, which is formed by connecting the cord tips of the other side of the cords, is also a straight line that extends in a transverse direction of the rubber crawler. The outlines are parallel with one another.

It can be seen from the same figure that in the mode shown in FIG. 14, the cord tips are positioned behind lugs and that outlines $A_3$-$A_3$ and $B_3$-$B_3$ each presents a step-shape.

In the embodied example shown in FIG. 15, lugs 39 are formed at a rubber crawler outer peripheral side with a predetermined angle ($\theta$) with respect to the longitudinal center line of the rubber crawler body. The lugs are parallel with one another at each side. The cord tips are positioned behind the respective lugs. Outlines $A_3$-$A_3$ and $B_3$-$B_3$ each presents a straight line.

In the mode shown in FIGS. 16 and 17, the driven protrusions 35 are provided regularly at predetermined intervals on the rubber crawler internal peripheral side. Within each of the driven protrusions 35 is embedded a bar-shape member 37 which extends in the transverse direction of the rubber crawler.

On a rubber crawler outer peripheral side, the lugs (projections) 39 are provided at locations opposite to respective driven protrusions 35 (i.e., at posterior positions).

The cord tips can be said to be disposed behind the driven protrusions 35 of the rubber crawler internal peripheral side or behind the lugs 39 of the rubber crawler outer peripheral side.

Because all of the above-described four modes adopts a structure in which the cord tips are all suppressed within a rubber crawler, it is possible to greatly reduce a possibility of the cords jutting out from the crawler body, and thus, promote reliability and durability of the rubber crawler.

Fourth Embodiment

Figure 18:
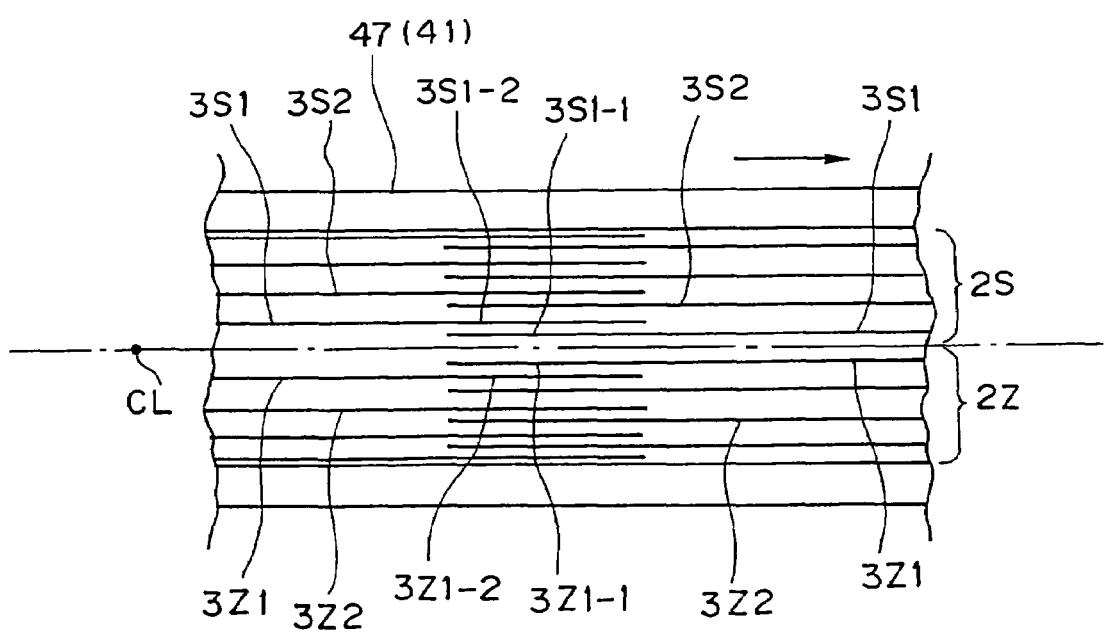
FIG. 18 is a plan view of a rubber crawler according to a fourth embodiment, showing connection portions of cord groups in an exaggerated manner.
Figure 19:
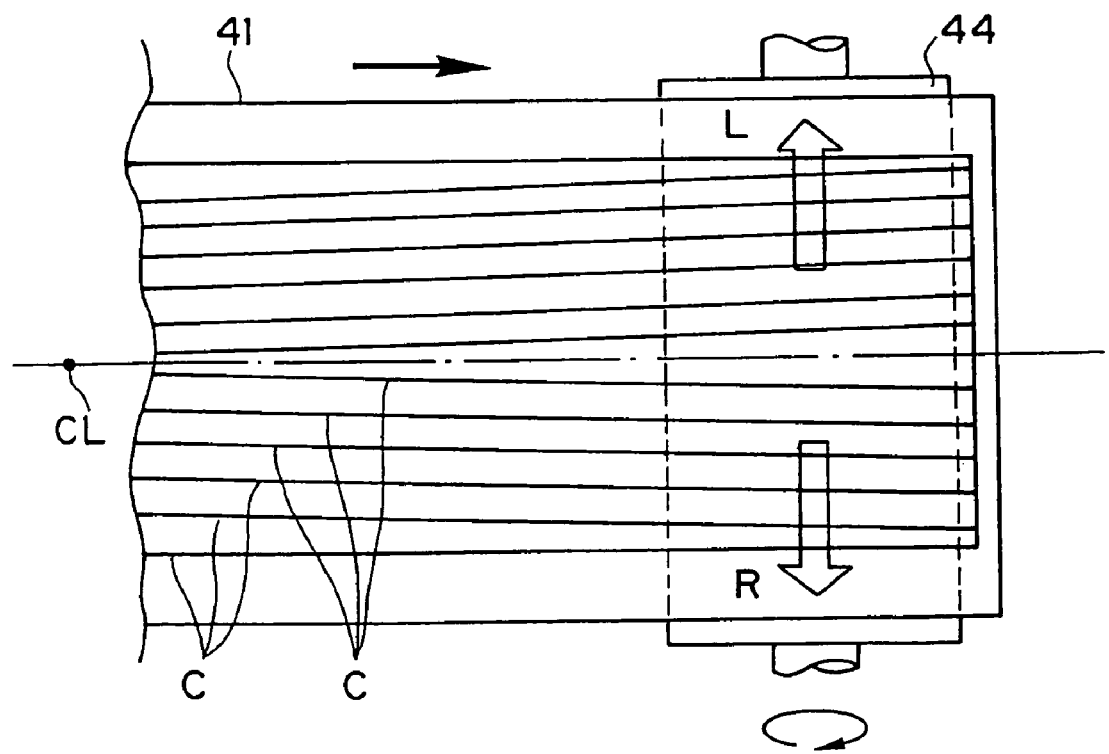
FIG. 19 is a view showing a behavior of the rubber crawler during operations thereof, according to the fourth embodiment.

Referring now to FIGS. 18 and 19, a fourth embodiment of the present invention will be described.

In the present embodiment, as in the above-described first through third embodiments, a thin elongated unvulcanized rubber sheet, which has steel cords embedded such that they are positioned in a certain imaginary plane and disposed parallel with one another at regular intervals, is preformed. Thereafter, the rubber sheet is arranged such that opposed ends thereof overlap one another by a predetermined length, and then, the overlapped portions of the rubber sheet are pressed and integrated. Thus, the loop-shaped rubber sheet 47 is finished.

Figure 20:
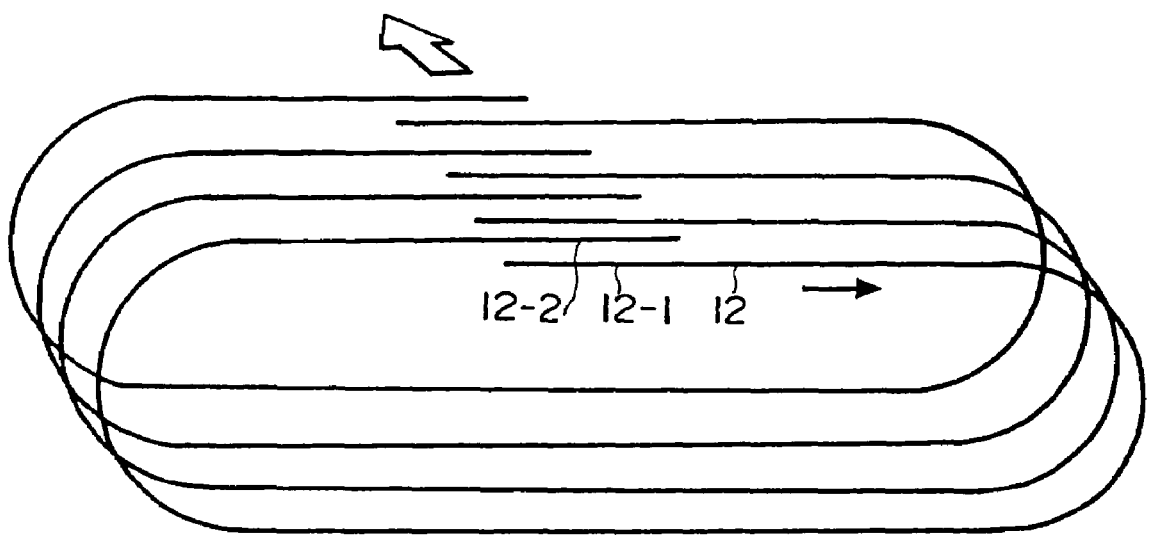
FIG. 20 is a perspective view exaggerating a cord arrangement to explain a behavior of a rubber crawler.

Referring now to FIG. 20, a number of cords are embedded to form main cords (reinforcing wires), each cord being wound into a spiral and having overlapped connection portions 12-1 and 12-2, as seen from the side end. As shown in FIG. 20, a length of wire at a nearest side is wound in one coil form from its starting end 12-1 to its terminal end 12-2, both ends being overlapped with one another, as seen from the side end. The starting end 12-1 and the terminal end 12-2 are included in substantially the same plane. Thus, flexural rigidity difference is minimized such that uniformity of rotation can be obtained and endurance can be improved. As described, FIG. 20 illustrates the structure in which the reinforcing wires (cords) are wound in a predetermined spiral direction such that the overlapped connection portions 12-1 and 12-2 are overlapped, when seen from the side end. In the same structure, when the rubber crawler rotates in a direction indicated by a black arrow, the cords have a slanted (right-hand screw direction) form and progress, each describing an S-shape. Therefore, if the rubber crawler is suspended around a drive sprocket, an idler wheel or the like, there is a possibility that a twisting force indicated by a white arrow will be generated in the rubber crawler. It is expected that an effect of this twisting force will become problematic, in particular, during high-speed operation.

However, the above potential problem is solved in the present embodiment as described hereinbelow.

A characteristic of the present embodiment is that the cords are symmetrically arranged relative to a longitudinal centerline CL extending in a peripheral direction of the rubber sheet 47 (rubber crawler 41).

Referring to FIG. 18, the embedded state is such that, the cord arrangement on one side and the cord arrangement on the other side are symmetrical with respect to the centerline CL extending in the rubber sheet peripheral direction.

Specifically, the cords which are arranged on the left side with respect to a direction of travel (a black arrow), are denoted by 2S as first main cords, and the cords which are arranged on the right side and spirally wound in an opposite direction, are denoted by 2Z as second main cords. In short, the structure is such that the first main cords 2S and the second main cords 2Z are separately disposed on the respective sides with respect to the centerline CL extending in the rubber crawler longitudinal direction and are placed on substantially the same plane.

More specifically, in the first main cords 2S, the cord 3S1 adjacent to the centerline CL is wound from its starting end 3S1-1 to its terminal end 3S1-2, making a S-shaped turn, these ends being connected in an overlapped manner. The remaining cords 3S2 etc. are wound in the same manner. In the second main cords 2Z, the cord 3Z1 adjacent to the centerline CL is wound from its starting end 3Z1-1 to its terminal end 3Z1-2, to form a Z-shaped turn, these ends are overlapped. The remaining cords 3Z2 etc. are wound in the same manner.

As described, the first main cords 2S and the second main cords 2Z are separately disposed on the respective sides relative to the centerline CL and are wound around the same plane. Due to this arrangement, when the rubber crawler 41 is entrained about a sprocket 44 and travels in a direction indicated by the black arrow, as shown in FIG. 19, a twisting force as indicated by a white arrow L is generated in the first main cords 2S side (the S-shape turned cords 3S1, 3S2, . . . ), while a twisting force as indicated by a white arrow R is generated in the second main cords 2Z side (the Z-shape turned cords 3Z1, 3Z2, . . . ). As a result, the forces counterbalance each other such that inconveniences such as running-off of the rubber crawler from the sprocket 44 are avoidable, and therefore, stable driven travelling motion can be obtained.

Again, as shown in FIG. 19, it is assumed that the rubber crawler 41 of the present embodiment is entrained around the sprocket 44 and is rotated in the arrow-indicated direction. Generally speaking, if the cords C are arranged so that they slant with respect to the direction of travel of the rubber crawler, an uneven force for displacement toward the inclined side is easily generated within the rubber crawler, and as a result thereof, the rubber crawler 41 might run off of the sprocket 44. However, in the present embodiment, because of the symmetrical cord arrangement relative to the centerline CL, two forces denoted by the white arrows L and R are counterbalanced with each other as shown in FIG. 19. Therefore, it is extremely difficult for the rubber crawler to run off. In other words, the rubber crawler 41 can reliably engage with the sprocket 44 for a long time.

Figure 21:
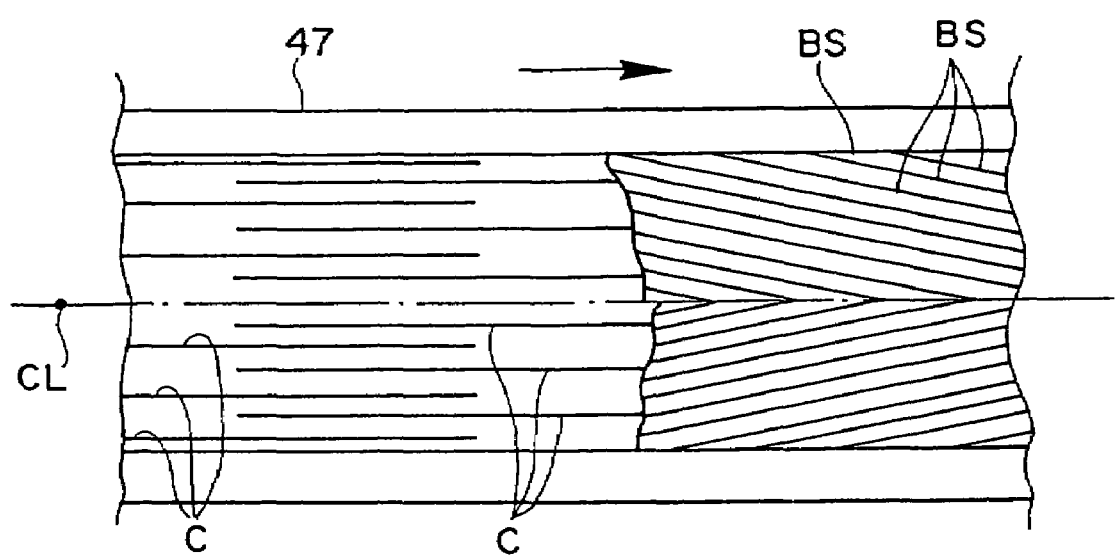
FIG. 21 is a view showing a relationship between a cord arrangement and bias sheets in a modified example of the fourth embodiment.

FIG. 21 illustrates a slightly-modified example of the structure of FIG. 18. This modified example uses bias sheets BS that are well known in the field of crawlers. The bias sheets BS are arranged such that bias cords BC like the steel cords are symmetrically disposed with respect to the centerline CL extending in the longitudinal direction. Those bias sheets BS also serve to prevent running-off of the rubber crawler.

Consequently, in this modified example, under a combination of the operation due to the structure which is similar to that of FIG. 18 and of the operation due to the bias sheets BS, it is surely possible to avoid that the rubber crawler runs off.

Incidentally, from a standpoint of making full use of bias sheets BS, another modified example such as shown in FIG. 21 is conceivable.

Figure 22:
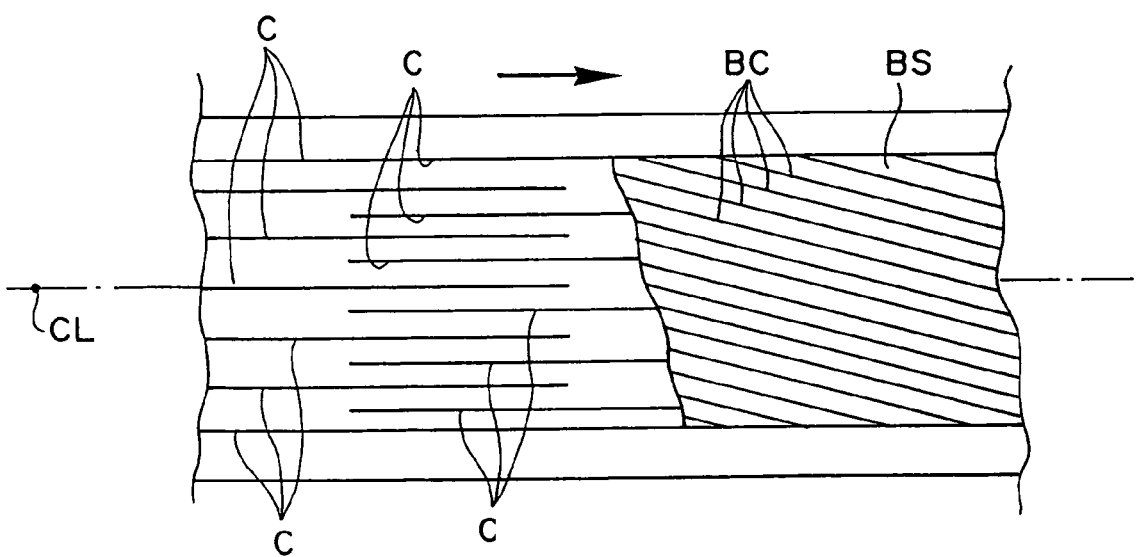
FIG. 22 is a view showing a relationship between a cord arrangement and bias sheets in another modified example of the fourth embodiment.

Referring to FIG. 22, cords C are all inclined toward the same side with respect to a rubber crawler moving direction. If this is the case, there might be a possibility of running off of the rubber crawler due to such an uneven force as described above. In the above, another modified example, however, to generate a force that can compensate for this uneven force, there are embedded specially prepared bias sheets BS.

As can be seen in FIG. 22, each of the steel cords C embedded in the rubber crawler body gradually approaches the left side as it proceeds in the arrow-indicated direction. On the other hand, each of the bias cords BC of the bias sheet BS approaches the right side (i.e., the opposite side) as it proceeds in the same way. Namely, both produce forces (urging forces), which can be counterbalanced with one another, and as a result, it becomes difficult for the rubber crawler to run off.

When a bias sheet is being used, embodiments in which the bias sheet is embedded at the rubber crawler inner peripheral side of the rubber sheet, at the rubber crawler outer peripheral side of the rubber sheet, and at both sides of the rubber sheet, are possible.

An embodiment shown in FIG. 23 and an embodiment shown in FIG. 24 will now be described. Note that they are only examples. Different embodiments can be adopted. For example, the number of bias sheets is not limited to the number of those illustrated and described below. A required number of bias sheets may be used.

Figure 23:
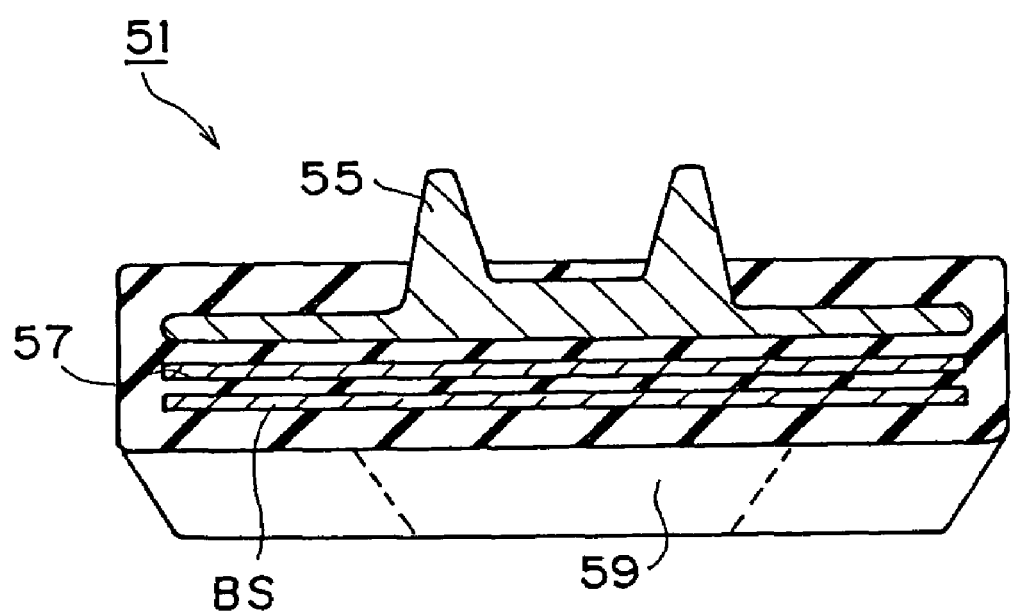
FIG. 23 is a transverse sectional view of an embodied rubber crawler including a bias sheet.

FIG. 23 illustrates a metal core type rubber crawler 51 in which a metal core 55 is disposed at the rubber crawler inner peripheral side (upper side in the same figure) and a lug 59 is disposed at the rubber crawler outer peripheral side (lower side in the same figure). At a position of a rubber crawler neutral plane located at the midpoint of the rubber crawler thickness, a rubber sheet 57, which includes cords (steel cords), is embedded. At the underside of the rubber sheet 57 (the rubber crawler outer peripheral side), the bias sheet BS (bias cords), which is substantially parallel thereto, is embedded.

Figure 24:
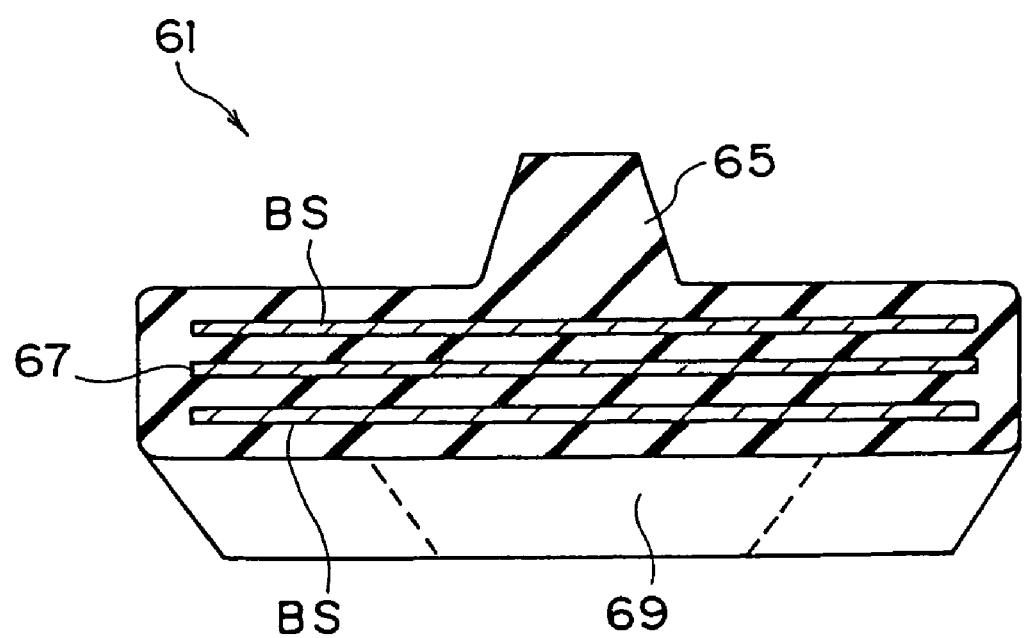
FIG. 24 is a transverse sectional view of another embodied rubber crawler including bias sheets.

FIG. 24 illustrates a core-less type rubber crawler 61, in which a driven protrusion 65 is located at the rubber crawler inner peripheral side (upper side in the same figure) and a lug 69 is located at the rubber crawler outer peripheral side (lower side in the same figure). At a position of a rubber crawler neutral plane located at the midpoint of the rubber crawler thickness, a rubber sheet 67, which includes cords (steel cords), is embedded. The bias sheet BS is embedded on each side, i.e., the upper side (the rubber crawler inner peripheral side) and the lower side (the rubber crawler outer peripheral side) with respect to the rubber sheet 67. Those sheets are parallel with one another. Preferably, the bias sheet is preferentially provided at the rubber crawler outer peripheral side.

INDUSTRIAL APPLICABILTY

As described above, according to the present invention, a rigidity difference between a connection portion of a rubber crawler body and the remaining body portion can be minimized and occurrences of buckling and breakage in the vicinity of the connection portion can be suppressed. It is also possible to greatly reduce separation of free ends of cords and occurrences of the cords sticking out of the crawler body. As a result, an elastic endless crawler that is low-priced and superior in durability and reliability can be placed on the market within a short period of time.

The invention claimed is:

1. A method of manufacturing an elastic endless crawler, the method comprising the steps of:
   (A) forming an elastic sheet, which includes a sheet body and cords having ends embedded within the sheet body, said cords being disposed substantially parallel with one another at predetermined pitches;
   (B) forming a non-endless belt which includes two end portions of the elastic sheet and a remaining portion of the elastic sheet, with said remaining portion being coated with a predetermined material; and
   (C) overlapping the two end portions of the non-endless belt and then applying pressure to them such that:
      the two end portions that overlap are integrated in order to have a reduced final thickness, and
      one end and the other end of each cord are overlapped in a longitudinal direction of the cord.

2. The manufacturing method of claim 1, wherein the method comprises a step for coating an uncoated sheet part to obtain a finished belt after the integration of the end portions.

3. The manufacturing method of claim 2, wherein the coating comprises vulcanizing.

4. The manufacturing method of claim 1, wherein the method comprises a step for disposing members to hold cord tips within a body of the non-endless belt so as to prevent the cord tips from running off from the body during use, and said members are disposed at at least one of an inner peripheral side and an outer peripheral side of the non-endless belt.

5. A method of manufacturing an elastic endless crawler, comprising the steps of:
   (A) forming an elastic sheet, which includes a sheet body and cords having ends embedded within the sheet body, said cords being disposed substantially parallel with one another at predetermined pitches;
   (B) overlapping two end portions of the elastic sheet and then applying pressure such that:
      the two end portions that overlap are integrated in order to have a reduced final thickness, and
      simultaneously making one end and the other end of each cord overlap in a longitudinal direction of the cord; and
   (C) forming an annular belt, in which the elastic sheet is entirely coated with a predetermined material.

6. The manufacturing method of claim 5, wherein the coating comprises a vulcanizing process.

7. The manufacturing method of claim 5, wherein the method comprises a step in which a plurality of members to hold cord tips within a body of the elastic sheet so as to prevent the cord tips from running off from the body during use are provided at at least one of an inner peripheral side and an outer peripheral side of the elastic sheet.

8. The manufacturing method of claim 1, wherein the cords are arranged with one end of each cord offset in a direction orthogonal to the longitudinal direction with respect to the other end of the cord by approximately half a pitch.

9. The manufacturing method of claim 1, further comprising:
   forming protrusions that protrude from a first side of the non-endless belt; and
   forming lugs that protrude from a second side of the non-endless belt, wherein every end of the cords is located adjacent at least one of the protrusions or is located adjacent at least one of the lugs.

10. The manufacturing method of claim 8, wherein the pitch is at least twice as large as a cord diameter when the cord diameter is less than a predetermined value, and the pitch is at least one and a half times as large as the cord diameter when the cord diameter is at least the predetermined value.

11. The manufacturing method of claim 1, wherein the cords are arranged to form a substantially symmetrical configuration relative to a centerline of the sheet body extending in the longitudinal direction of the cord.

12. The manufacturing method of claim 1, wherein the cords further comprise a first main cord and a second main cord, a winding direction of the first main cord is opposite of that of the second main cord, and the first main cord and the second main cord are arranged in substantially a same surface and separated from each other relative to a centerline of the sheet body extending in the longitudinal direction of the cord.

13. The manufacturing method of claim 5, wherein the cords are arranged with one end of each cord offset in a direction orthogonal to the longitudinal direction with respect to the other end of the cord by approximately half a pitch.

14. The manufacturing method of claim 5, further comprising:
   forming protrusions that protrude from a first side of the elastic sheet; and
   forming lugs to protrude from a second side of the elastic sheet, wherein every end of the cords is located adjacent at least one of the protrusions or is located adjacent at least one of the lugs.

15. The manufacturing method of claim 13, wherein the pitch is at least twice as large as a cord diameter when the cord diameter is less than a predetermined value, and the pitch is at least one and a half times as large as the cord diameter when the cord diameter is at least the predetermined value.

16. The manufacturing method of claim 5, wherein the cords are arranged to form a substantially symmetrical configuration relative to a centerline of the sheet body extending in the longitudinal direction of the cord.

17. The manufacturing method of claim 5, wherein the cords further comprise a first main cord and a second main cord, a winding direction of the first main cord is opposite of that of the second main cord, and the first main cord and the second main cord are arranged in substantially a same surface and separated from each other relative to a centerline of the sheet body extending in the longitudinal direction of the cord.

* * * * *